US010338803B2

(12) United States Patent
De Bossoreille

(10) Patent No.: US 10,338,803 B2
(45) Date of Patent: Jul. 2, 2019

(54) INTERFACE FOR AIRCRAFT AND METHOD OF CONTROL OF SUCH AN INTERFACE

(71) Applicant: Zodiac Aero Electric, Montreuil (FR)

(72) Inventor: Romain De Bossoreille, Paris (FR)

(73) Assignee: Zodiac Aero Electric, Montreuil (FR)

( * ) Notice: Subject to any disclaimer, the term of this patent is extended or adjusted under 35 U.S.C. 154(b) by 69 days.

(21) Appl. No.: 15/438,465

(22) Filed: Feb. 21, 2017

(65) Prior Publication Data
US 2017/0242564 A1    Aug. 24, 2017

(30) Foreign Application Priority Data
Feb. 22, 2016    (FR) ...................................... 16 51426

(51) Int. Cl.
G06F 3/041    (2006.01)
G06F 3/0488    (2013.01)
(Continued)

(52) U.S. Cl.
CPC ........... G06F 3/0488 (2013.01); G01C 23/00 (2013.01); G06F 3/0416 (2013.01);
(Continued)

(58) Field of Classification Search
CPC ......... G06F 3/0488; G06F 2203/04803; G06F 3/1454; G06F 3/0416; G06F 2203/0383;
(Continued)

(56) References Cited

U.S. PATENT DOCUMENTS

2008/0197990 A1* 8/2008 Yamamoto ............. B60K 35/00
340/438
2008/0208399 A1    8/2008 Pham
(Continued)

FOREIGN PATENT DOCUMENTS

WO    2011/106379 A1    9/2011
WO    2012/112090 A1    8/2012
WO    2013/013243 A1    1/2013

OTHER PUBLICATIONS

Allen, D., "Electronic Flight Bag," Sep. 22, 2008, Aero, The Boeing Company, <http://web.archive.org/web/20061010202846/http://www.boeing.com/commercial/aeromagazine/aero_23/EFB_story.html> [retrieved Sep. 27, 2016], 17 pages.
(Continued)

Primary Examiner — Nitin Patel
Assistant Examiner — Amy Onyekaba
(74) Attorney, Agent, or Firm — Christensen O'Connor Johnson Kindness PLLC

(57) ABSTRACT

This interface for aircraft comprises an assemblage of at least one display device for the display of data, at least one support (L) for portable computer equipment comprising means of power supply for the computer equipment, bidirectional means of data transfer to the computer equipment and a communication gateway (4) between the support and the onboard display device, comprising means of copying image data in order to copy the image data coming from the computer equipment onto at least a portion of the screen of at least one of the display devices and means of transfer of data representative of a command gesture between the display device and the support.

9 Claims, 2 Drawing Sheets

(51) Int. Cl.
*G01C 23/00* (2006.01)
*G09G 5/14* (2006.01)
*G06F 3/14* (2006.01)
(52) U.S. Cl.
CPC ............ *G06F 3/1454* (2013.01); *G09G 5/14* (2013.01); *G06F 2203/0383* (2013.01); *G06F 2203/04803* (2013.01); *G09G 2340/12* (2013.01); *G09G 2340/125* (2013.01); *G09G 2370/16* (2013.01); *G09G 2380/12* (2013.01); *G09G 2380/14* (2013.01)
(58) Field of Classification Search
CPC ...... G01C 23/00; G05D 1/00; G09G 2380/14; G09G 5/14; G09G 2380/12; G09G 2340/12; G09G 2340/125; G09G 2370/16
See application file for complete search history.

(56) References Cited

U.S. PATENT DOCUMENTS

| | | | | |
|---|---|---|---|---|
| 2009/0198392 | A1* | 8/2009 | Eicke | G01C 23/005 701/3 |
| 2011/0238239 | A1* | 9/2011 | Shuler | G06F 9/5077 701/3 |
| 2011/0251791 | A1* | 10/2011 | Roux | G01C 21/165 701/469 |
| 2013/0335300 | A1* | 12/2013 | Tajima | G06F 3/1454 345/2.3 |
| 2014/0063037 | A1* | 3/2014 | Danielsson | G08G 5/0021 345/581 |
| 2014/0095000 | A1* | 4/2014 | Waller | B60K 37/06 701/2 |
| 2014/0222254 | A1 | 8/2014 | Ribich | |
| 2015/0194833 | A1* | 7/2015 | Fathollahi | H02J 7/0044 320/114 |
| 2016/0034250 | A1* | 2/2016 | McCullough | G06F 3/017 704/275 |
| 2016/0103579 | A1* | 4/2016 | Coulmeau | G08G 5/0021 701/533 |
| 2016/0122036 | A1* | 5/2016 | Hathaway | B64C 19/00 701/14 |

OTHER PUBLICATIONS

French Search Report dated Sep. 16, 2016, issued in Application No. FR1651426, filed Feb. 22, 2016, 10 pages.

* cited by examiner

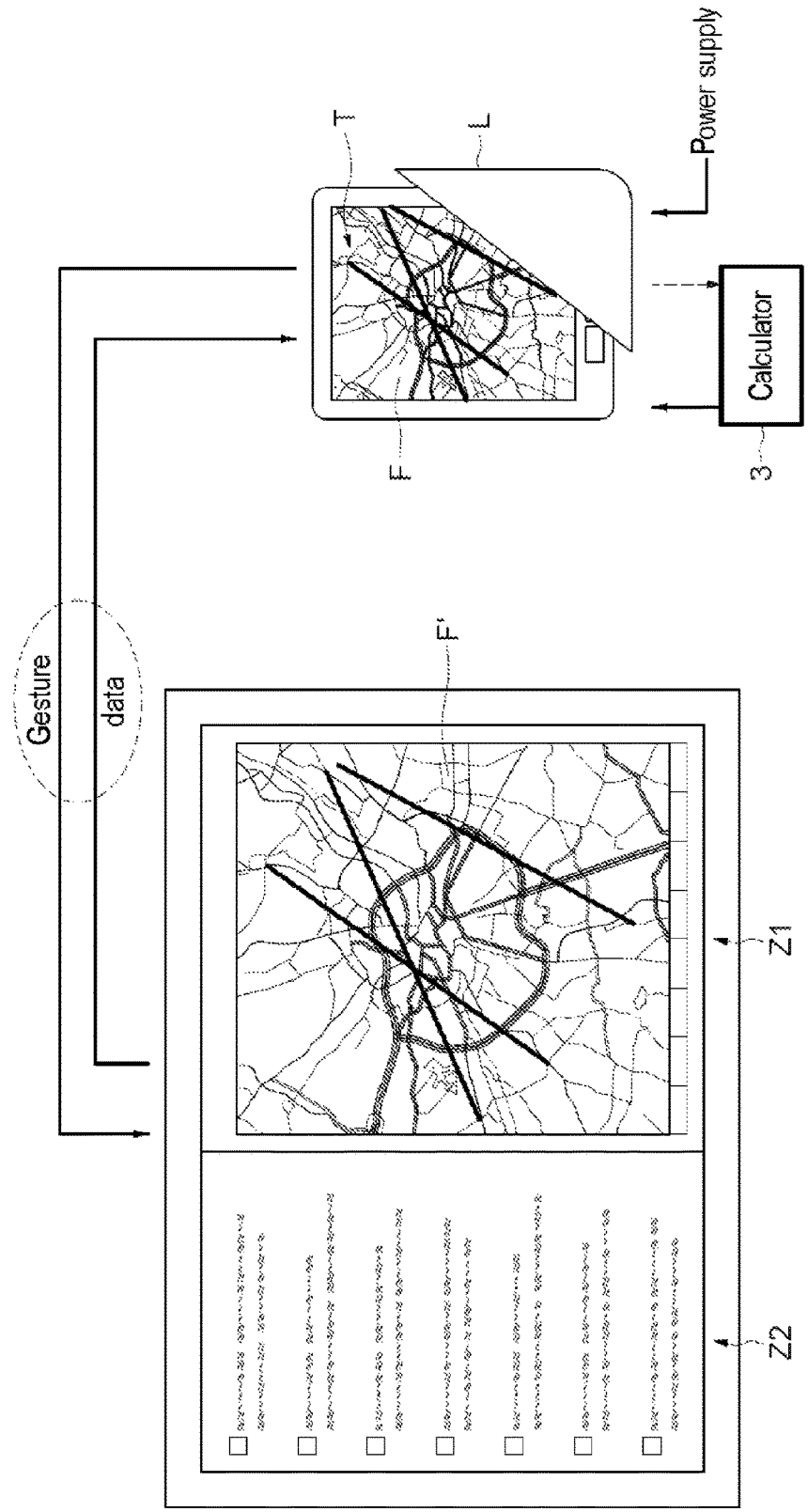

INTERFACE FOR AIRCRAFT AND METHOD OF CONTROL OF SUCH AN INTERFACE

The present invention concerns, in a general manner, interfaces for aircraft.

Interfaces for aircraft can be placed in the cockpit of an aircraft or in the cabin.

For example, insofar as the interfaces situated in a cockpit are concerned, these comprise a plurality of control panels, especially a main central panel grouping together essentially the navigation and control screens, a lower panel grouping together essentially the flight controls, and an upper panel providing in particular for the management of various hydraulic and electrical circuits onboard the aircraft.

These panels, and in particular the central panel, are provided with a certain number of screens enabling the displaying of flight data and, when these screens are touch screens, enabling the entering of commands for various functions onboard the airplane.

Furthermore, airline companies distribute documentation to their pilots which can be consulted by accessing a certain portion of data. They may be operating manuals, navigation charts, documentation regarding the operation of the airplane, etc.

More and more this documentation is being provided on electronic media, particularly in the form of portable computers or touch tablets for the public at large. These electronic media are known by the term "Electronic Flight Bag" or "EFB".

It has been found that touch tablets are being used more and more within airline companies, particularly by virtue of their relatively reduced footprint and their ease of use. In particular, it is possible to store specific applications in the tablets making them customizable by the pilot or by the airline companies to improve ergonomics. In this regard, tablets have a particularly suitable ergonomics for the display of navigation charts.

It has furthermore been found that the tablets can be rapidly updated, and this at lower cost.

However, one finds that the use of touch tablets in the cockpit of an aircraft poses a certain number of major inconveniences.

In the first place, the touch technology employed on a tablet, such as a capacitive tablet, can be perturbed by magnetic fields and thus produce an unwanted behavior or result in providing of erroneous or inappropriate information, which may prove to be dangerous.

Furthermore, touch tablets which are easy to handle still remain cumbersome in that they need to be constantly held by hand or be set down on the cockpit, since no place is provided in the cockpit to hold them. Thus, they can fall, get broken, be hurled in the air, or drop onto equipment.

Moreover, despite their ease of use, certain touch gestures might be uncomfortable during certain phases of flight.

Their performance in terms of luminosity, contrast, and colorimetry may furthermore be insufficient for a use in the cockpit of an aircraft.

It has moreover been found that the battery life of the tablet might be less than that of a flight.

Solutions such as cables or supports have been proposed for interconnecting the tablet to the equipment of the aircraft, but they entail the user having to continue to interact directly on the tablet, which does not get rid of the aforementioned defects.

Finally, in a general manner, the applications present on the tablet may distract the user, especially a pilot in the cockpit of an aircraft. The absence of a mechanism for deactivating certain unwanted applications and/or notifications, especially in event of an alarm, constitutes a danger.

In view of the above, the purpose of the invention is to mitigate the various inconveniences mentioned above and to provide an interface for aircraft enabling and facilitating the use of touch tablets and, in general, portable computer equipment onboard the aircraft.

Thus, the purpose of the invention, in a first aspect, is an interface for aircraft, comprising an assemblage of at least one display device for the display of data and at least one support for portable computer equipment comprising means of power supply for the computer equipment.

The interface furthermore comprises bidirectional means of data transfer to the computer equipment and a communication gateway between the support and the display device, comprising means of copying image data in order to copy the image data coming from the computer equipment onto at least a portion of the screen of at least one of the display devices and means of transfer of data representative of a command gesture between the display device and the support.

It will be noted that the computer equipment may consist of any type of equipment of the touch tablet or portable computer type.

Thus, the computer equipment can be positioned in a dedicated support, which ensures its power supply and the bidirectional transfer of data between one or more screens of the display device of the aircraft and the computer equipment, especially in order to superimpose on a screen of the display device the information available on the computer equipment and enable the entry of commands directly from the display device.

The computer equipment able to be protected from the outside by the support can then be controlled from the screen of the control panel.

Advantageously, the display device has shapes around the screen such as grooves or protrusions allowing a user to interact more easily with the touch device during different phases of flight, especially during turbulence, while reducing muscle fatigue involved in the interaction.

Of course, supplemental information coming, for example, from an onboard calculator can be displayed together with the copied image data, advantageously in the form of a window placed alongside the window for copying of image data coming from the computer equipment.

Thus, according to another characteristic of the interface of the invention, the communication gateway comprises a data integrator adapted to merge the data coming from the computer equipment, the data coming from the display device and the data coming from the calculator and to distribute the data among the display device, the computer equipment, and the calculator.

In general, the communication gateway is furthermore adapted to the transfer of commands entered manually on said display device to the computer equipment and/or to the calculator.

Advantageously, the gateway comprises a data converter between the computer equipment and the calculator, on the one hand, and the display device, on the other hand.

Advantageously, the screen of the display device comprises touch zones reproducing the respective control buttons provided on the computer equipment.

Preferably, the support is placed in a housing outfitted with means of protection against outside assault such as, but not limited to, electromagnetic radiation, impacts, or liquids.

Furthermore, there will preferably be provided means of deactivating functionalities of the computer equipment, especially wireless communication functionalities of the computer equipment.

The invention also concerns, in a second aspect, a method of control of the display of data on an interface such as the one defined above, wherein the image data coming from the computer equipment is displayed on at least a portion of the screen of the display device and representative data of a command gesture is transferred between the display device and the computer equipment.

Preferably, according to this method, the data from the computer equipment is superimposed in a first zone of the screen of the display device and data coming from the onboard calculator is displayed in a second zone of the screen.

Other purposes, characteristics and advantages of the invention will appear upon perusal of the following description, given solely as an example, and making reference to the appended drawings, in which:

FIG. 3 is a view of the interface for aircraft according to the invention, showing the copying of image data coming from the computer equipment onto the screen of the display device.

Figure 1:
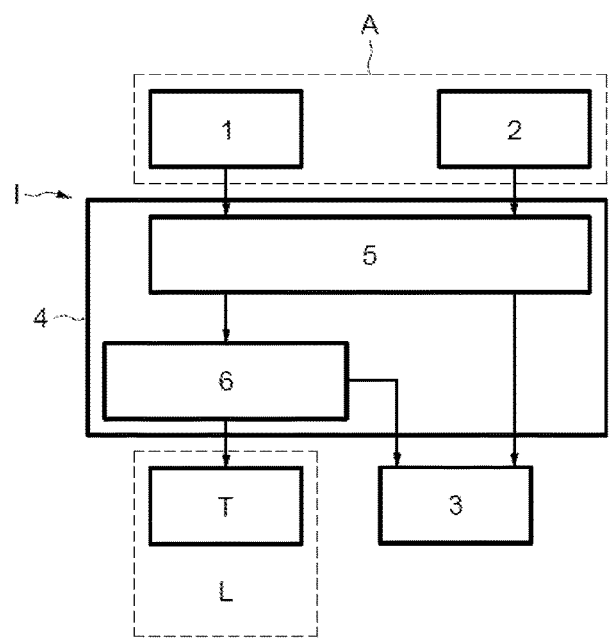
FIG. 1 illustrates a general view of an interface according to the invention.

First of all referring to FIG. 1, this illustrates schematically the general structure of an interface for aircraft according to the invention.

In one embodiment, in no way limiting, this interface is intended to be carried onboard an airplane, for example, in the cockpit of the airplane or in the cabin. Yet one does not leave the scope of the invention when the interface is intended to be installed in other types of aircraft.

This interface, denoted by reference I, is designed to establish an interaction between computer equipment and a display device A carried onboard the aircraft. It may be a display device of classical type outfitting the cockpits of aircraft for the display of information regarding avionic functions and, in the case of touch type display devices, for retrieving commands entered manually by a pilot. It can also be a display device of an entertainment system of the classical type outfitting the cabins of aircraft, at the disposal of the passengers.

In the sample embodiment under consideration, the computer equipment is constituted of a touch tablet T, for example, a touch tablet designed for the public at large, or a touch tablet specifically designed for the application in question.

In the sample embodiment illustrated in FIG. 1, the display device has a touch screen. Thus, in FIG. 1, the display device A has been indicated by its screen 1 and its touch sensor 2. It is intended for the displaying of data, such as fixed images or videos provided by a calculator 3 carried onboard the aircraft. This can be an avionics calculator or a calculator of the entertainment system of the aircraft. It will be noted, however, that the calculator 3 is optional, so that the content shown on the display device can come from another source.

The interface I furthermore comprises a housing L designed to receive the touch tablet T.

This housing constitutes a support outfitted with appropriate connectors for connecting the tablet to ensure its power supply and a bidirectional transfer of data to and from the tablet.

It will be noted that, in the sample embodiment shown, the interface comprises a single housing L. Of course, one will not leave the scope of the invention if one or more housings are provided, each intended to receive a touch tablet.

The interface I is furthermore provided with a gateway 4 for communication between the housing L and the display device A.

This gateway 4 comprises a data integrator 5 as well as a data converter 6. By data is meant here image data, stationary or moving, touch data resulting from a manipulation of the touch screen of the display device, and technical data regarding the aircraft. The integrator 5 communicates with the display device A, with the onboard calculator 3 and with the housing L via the converter 6.

The converter ensures a conversion of format between the display device, the tablet and the calculator.

The integrator 5 receives the data coming from the display device A, from the tablet T and from the calculator 3, performs the graphic composition of this data, and distributes the data among the display device A, the tablet T and the calculator.

When it involves a retrieval of content, such as stationary images or videos coming from the tablet T, the integrator 5 ensures a graphic composition of the data retrieved and carries out a displaying of this data on the screen 1. This may involve, for example, the displaying of navigation charts coming from the tablet on the screen 1, when the interface is intended to be placed in the cockpit of the aircraft, or video content extracted from the tablet when the interface is intended to be placed in the cabin.

It will be noted in this regard that the integrator carries out a copying of the image data coming from the tablet so as to display the data on a portion of the screen of the display device or on the entire display screen. In the latter case, the integrator ensures a partitioning of the screen of the display device in order to bound off zones of the screen assigned to the display of content coming from the tablet on the one hand and content coming from the calculator 3 on the other hand.

Figure 2:
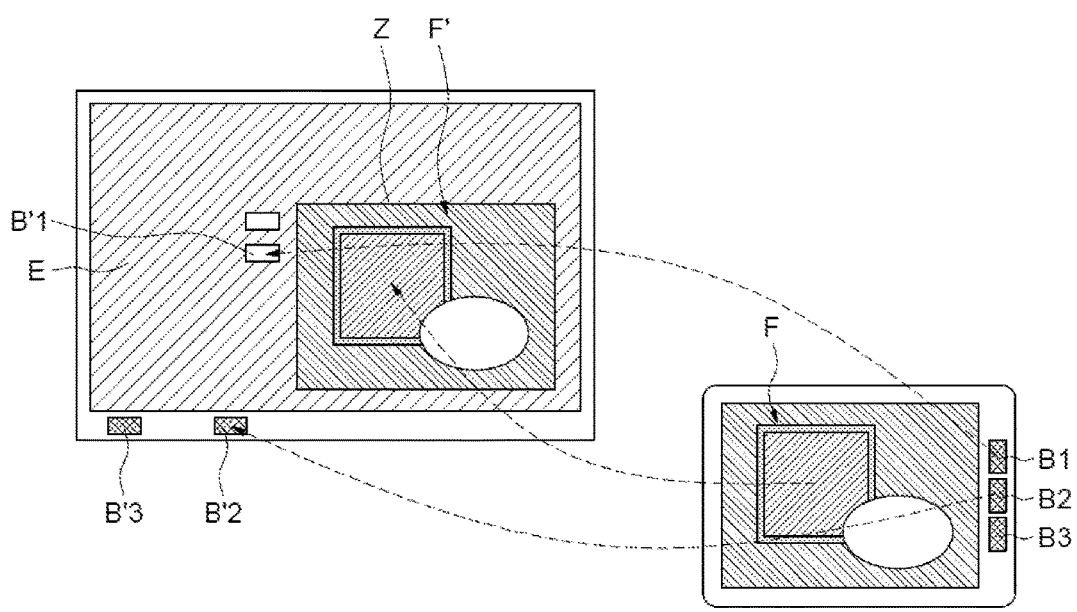
FIG. 2 illustrates a sample embodiment of the interface appearing in FIG. 1.

FIG. 2 schematically represents the copying of the image data between the screen of the touch tablet and a screen 1 of the display device.

As can be seen, the screen of the tablet (zone Z) is copied and displayed in a zone Z' of identical size, or one of increased dimensions so as to cover the entire screen 1 of the control panel if necessary.

The mechanical control buttons B1, B2 and B3 which are provided on the frame of the tablet, that is, on the mechanical part of the tablet, are likewise duplicated on the display device A.

For example, this may involve providing touch zones on the screen 1 (button B'1) to duplicate one or more mechanical buttons B1 of the frame.

Other mechanical buttons B2 and B3 may likewise be duplicated in the form of corresponding buttons provided on the frame of the display device A (buttons B'2 and B'3). Of course, as a variant, they could be duplicated in the form of touch zones of the display device A.

Thus, the user, i.e. the pilot or a passenger, has at their disposal information which is displayed on the screen of the tablet and all of the control buttons allowing the control of the tablet, which are duplicated on the screen 1.

As stated above, the integrator ensures a partitioning of the display device A by bounding off zones dedicated respectively to the displaying of data coming from the tablet and data coming from the calculator onboard.

In FIG. 3, which shows an example of an interface for the cockpit of an aircraft, the tablet T is placed in its housing L. The housing L is powered by the onboard network of the aircraft, and therefore it powers the tablet, and communicates with the calculator 3 of the aircraft and with the display device A by means of the gateway 4 for the exchanging of fixed image or video data to the display device, on the one hand, and for the exchanging of data coming from the touch sensor of the screen of the display device to the tablet or to the calculator, on the other hand.

As can be seen, the image of the tablet (window F) is superimposed in a zone Z1 dedicated to the displaying of the content extracted from the tablet (window F').

Furthermore, a second zone Z2 is dedicated to the displaying of data coming from the calculator, for example, data regarding the piloting of the aircraft.

Such a partitioning is likewise provided when the interface is designed to be carried in the cabin for the simultaneous displaying of the content of the tablet and the content coming from the calculator of the entertainment system, for example, data concerning the flight (altitude, speed, etc.) or data of another kind coming from the entertainment system (advertising, etc.).

Of course, when the screen of the display device is a touch screen, the screen is partitioned so that the gateway 4 is able to retrieve the gestures resulting from the manipulation of the respective zones Z1 and Z2 in order to send them to the tablet or the calculator.

Thus, when a gesture involves the zone Z2 dedicated to the displaying of avionics data, this gesture retrieved by the integrator 5 is transmitted to the calculator or in general manner to an avionics system for which the corresponding command is destined.

When the gesture concerns the zone Z1 dedicated to the displaying of the content of the tablet, this gesture is retrieved by the integrator 5 and transmitted to the tablet via the converter 6.

The invention thus enables the realization of a connection between a touch tablet intended for the public at large, or a touch tablet specifically dedicated to use in the field of aviation, and a screen of a display device onboard, and making use of the equipment of the aircraft for an interaction with the tablet.

It will be noted that preferably the housing L is equipped with means of protection of the tablet against electromagnetic radiation. Of course, when the tablet is stowed in the housing, it is protected against outside assault, for example, spilling of liquid or impact. Any risk of dropping the tablet is of course prevented.

Finally, one may advantageously provide a specific button on the screen 1 for the deactivating of certain functionalities of the tablet, for example to deactivate the means of wireless communication to and from the tablet, or to deactivate certain applications saved in the tablet.

It will be noted, finally, that in the sample embodiment presented the different elements of the interface communicate by wired link. Such is the case in particular for the housing L and the gateway 4. Of course, one may likewise provide a wireless communication between these different elements.

The embodiments of the invention in which an exclusive property or privilege is claimed are defined as follows:

1. An interface for an aircraft, the aircraft including an assemblage of at least one display device having a screen for display of data, the interface comprising:
  a communication gateway; and
  at least one support configured to receive portable computer equipment, wherein the support includes connectors configured to supply power to the portable computer equipment and bidirectional data transfer to and from the portable computer equipment and the communication gateway,
  wherein the communication gateway is disposed between the support and the display device, wherein the communication gateway is configured to copy image data from the portable computer equipment onto at least a portion of the screen of the display device, and wherein the communication gateway is configured to transfer data representative of a command gesture between the display device and the support.

2. The interface as claimed in claim 1, wherein the communication gateway comprises a data integrator configured to merge data coming from the portable computer equipment, the display device, and a calculator onboard the aircraft, and wherein the data integrator is configured to distribute the merged data among the display device, the portable computer equipment, and the calculator.

3. The interface as claimed in claim 2, wherein the communication gateway is configured to transfer commands entered manually on the display device to the portable computer equipment and/or to the calculator.

4. The interface as claimed in claim 1, wherein the communication gateway comprises a data converter provided between the portable computer equipment and a calculator onboard the aircraft, and between the portable computer equipment and the display device.

5. The interface as claimed in claim 1, wherein the screen of the display device comprises touch zones reproducing respective control buttons provided on the portable computer equipment.

6. The interface as claimed in claim 1, wherein at least a portion of the support is placed in a housing configured to protect the interface against outside assault.

7. The interface as claimed in claim 1, further comprising a specific button configured to deactivate functionalities of the portable computer equipment, and wherein the functionalities of the portable computer equipment to be deactivated includes wireless communication functionalities of the portable computer equipment.

8. A method of controlling display of data using an interface the method comprising:
  displaying screen content of a portable computer equipment on a screen of a display device onboard of an aircraft by copying image data from the portable computer equipment onto at least a portion of the screen of the display device; and
  transferring data representative of a command gesture between the display device and the portable computer equipment,
  wherein the interface comprises a communication gateway and at least one support, the support configured to receive portable computer equipment, the support including connectors configured to supply power to the portable computer equipment and bidirectional data transfer to and from the portable computer equipment and the communication gateway, and the communication gateway disposed between the support and the display device.

9. The method as claimed in claim 8, wherein displaying screen content of the portable computer equipment on the screen of the display device comprises the image data from the portable computer equipment superimposed in a first zone of the screen of the display device and data coming from an onboard calculator displayed in a second zone of the display device.

\* \* \* \* \*